United States Patent [19]

Jaquette

[11] Patent Number: 4,572,551
[45] Date of Patent: Feb. 25, 1986

[54] FLUID CONNECTOR

[75] Inventor: Robert D. Jaquette, Charlotte, Mich.

[73] Assignee: Air-Way Manufacturing Company, Olivet, Mich.

[21] Appl. No.: 511,287

[22] Filed: Jul. 6, 1983

[51] Int. Cl.$^4$ .............................................. F16L 33/16
[52] U.S. Cl. ................... 285/108; 285/347; 285/355; 285/332.2
[58] Field of Search ............. 285/108, DIG. 18, 351, 285/379, 347, 355, 332.2, 110

[56] References Cited

U.S. PATENT DOCUMENTS

| | | | |
|---|---|---|---|
| 640,197 | 1/1900 | Hewlett | 285/329 |
| 2,118,670 | 5/1938 | Green | 285/332.3 |
| 2,131,509 | 9/1938 | Goepel et al. | 285/334.1 |
| 2,192,565 | 3/1940 | Szekely | 285/354 |
| 2,239,942 | 4/1941 | Stone et al. | 285/110 |
| 2,760,673 | 8/1953 | Laurent | 285/342 |
| 2,788,231 | 7/1953 | Crow | 285/174 |
| 3,160,426 | 12/1964 | Faeser | 285/334.5 |
| 3,258,279 | 6/1966 | Johnsen | 285/110 |
| 3,489,437 | 10/1970 | Duret | 285/355 |
| 3,600,010 | 8/1971 | Downs et al. | 285/351 |
| 4,025,092 | 5/1977 | Wakefield | 285/110 |

FOREIGN PATENT DOCUMENTS 2417051 10/1979 France .............................. 285/379

*Primary Examiner*—Cornelius J. Husar
*Assistant Examiner*—Eric Nicholson
*Attorney, Agent, or Firm*—Reising, Ethington, Barnard, Perry & Milton

[57] ABSTRACT

A connector assembly 10 including a first member 16, 20 including a first fluid passageway 14, 18 therethrough and a female end portion having a conical surface 22, 58. A connector member 12 includes a second passageway 28 therethrough in fluid communication with the first passageway 14, 18 and a male end portion having a conical surface 30 in mating engagement with the conical surface 22, 58 of the female end portion. The connector member 12 is either directly threaded into the first member 16 or secured to the first member 20 by a nut member 36 to axially urge the conical surfaces 22, 30, 58 into mating engagement. The assembly 10 is characterized by the second passageway 28 within the male end portion of the connector member 12 having an increased diameter defining an annular recessed wall 38 which is outwardly radially deflectable in response to internal pressure applied against the recessed wall to perfect a seal between the conical surfaces 22, 30, 58.

10 Claims, 1 Drawing Figure

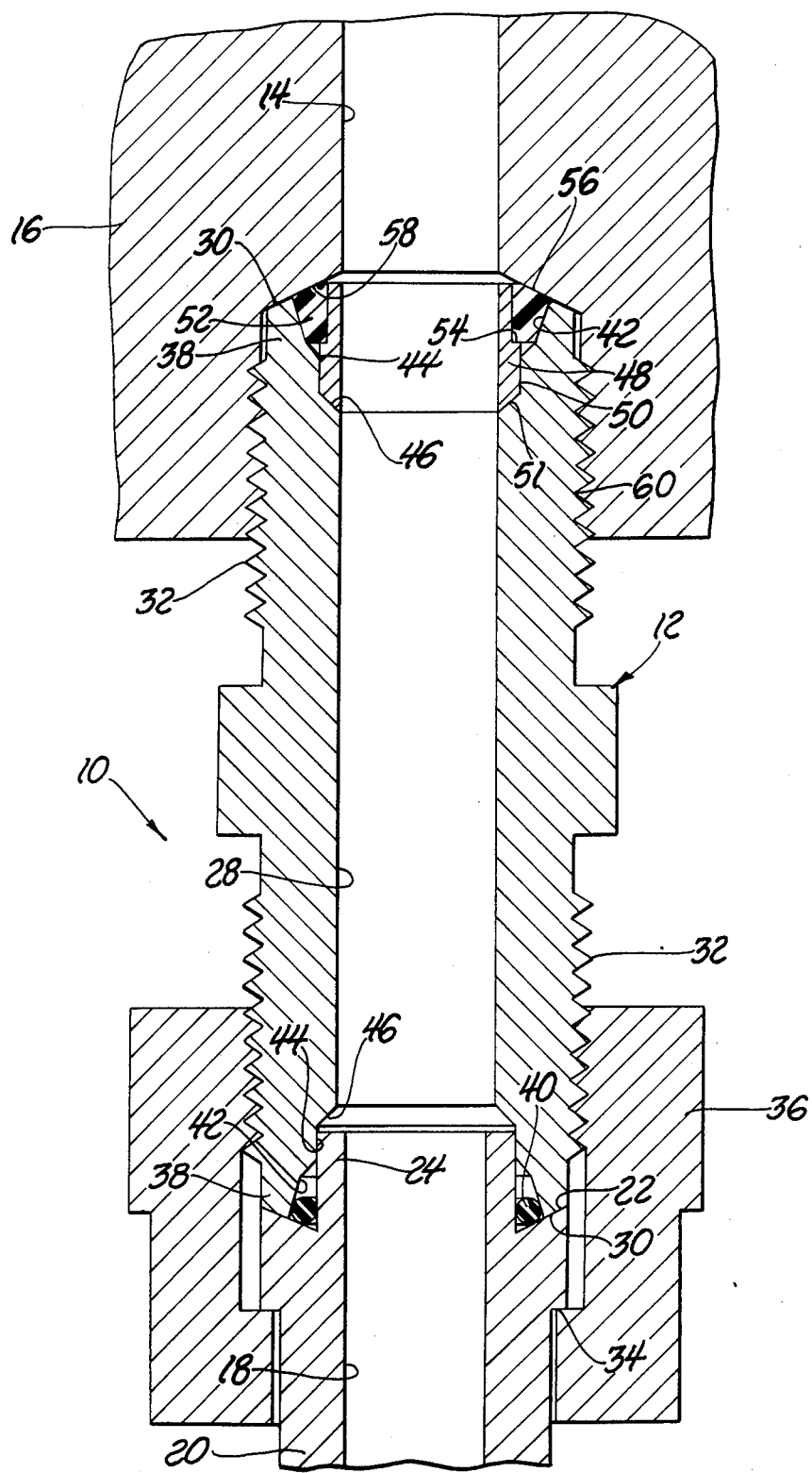

4,572,551

FLUID CONNECTOR

TECHNICAL FIELD

The instant invention relates to high pressure pipe line couplings of the type for connecting a pipe casing to a tubing line.

BACKGROUND ART

Connectors are commonly used to connect fluid conduits which establish high pressure fluid communication between a source of high pressure, such as a pump, and a load, such as a motor. Various configurations have been used to perfect a fluid seal in the connector. U.S. Pat. No. 640,197 to Hewlett, issued Jan. 2, 1900, discloses mating beveled end portions of two members joined together by a nut. The nut axially urges the members together. The beveled end portions of the connected members are rigid. The U.S. Pat. No. 2,788,231 to Crow, issued Apr. 9. 1957, shows an internal expandable seal, the seal not being adaptable to high pressure environments. U.S. Pat. No. 3,258,279 to Johnsen, issued June 28, 1966, discloses the use of an L-shaped gasket disposed within the rigid beveled male end portion of a first member in mating engagement with the female beveled portion of a second member. The gasket deflects in response to fluid pressure to seal the parting line between the mating beveled end portions. The instant invention provides an improvement over the prior art wherein the primary seal is perfected directly between the beveled mating surfaces of the connected members. The beveled end portion of the connector is deflectable in response to the internal high pressure to perfect the seal against the female beveled surface of the connected member.

STATEMENT OF THE INVENTION

In accordance with the present invention, there is provided a connector assembly including a first member having a first fluid passageway therethrough and a female end portion having a conical surface. A second member includes a second passageway therethrough in fluid communication with the first passageway and a male end portion having a conical surface in mating engagement with the conical surface of the female end portion. Connecting means axially urges the conical surfaces into mating engagement. The assembly is characterized by the second passageway within the male end portion having an increased diameter defining a recessed wall thereabout which is outwardly radially deflectable in response to internal fluid pressure against the recessed wall to perfect a seal between the conical surfaces.

FIGURES IN THE DRAWINGS

An embodiment of a connector assembly constructed in accordance with the present invention will now be described by way of example only, with reference to the accompanying drawing which is a cross-sectional view of the subject connector assembly showing a different embodiment of the subject invention at each end of the connector.

DETAILED DESCRIPTION OF THE DRAWINGS

Referring to the FIGURE, a connector assembly constructed in accordance with the instant invention is generally shown at 10.

A connector member, generally indicated at 12, provides fluid communication between the fluid passageway 14 of a pump casing 16 and the fluid passageway 18 of a line member 20 leading to high pressure tubing (not shown).

Referring specifically to the line member 20, the line member 20 has a female end portion having a conical surface 22. The line member 20 further includes an annular neck portion 24 disposed within and beyond the conical surface 22. The connector 12 includes a passageway 28 extending therethrough for fluid communication between the passageway 14 of the pump casing 16 and the passageway 18 of the line member 20. The connector 12 has a male end portion having a conical surface 30 in mating engagement with the conical surface 22 of the female end portion of the line member 20.

The assembly includes connecting means for axially urging the conical surfaces 22, 30 into mating engagement. The connecting means comprises an outer threaded surface 32 of the connector member 12, a shoulder 34 of the line member 20 and a nut member 36 which threadedly engages the threaded portion 32 of the connector 12 while engaging the shoulder 34 so as to axially urge the conical female surface 22 of the line member 20 against the male conical surface 30 of the connector member 12.

The assembly 10 is characterized by the passageway 28 within the male end portion of the connector member 12 having an increased diameter defining a recessed wall 38 thereabout. The recessed wall 38 is outwardly radially deflectable in response to internal fluid pressure applied against the recessed wall 38 to perfect a seal between the conical surfaces 22 and 30. In other words, unlike prior art assemblies wherein a seal is either perfected by axial urging of conical surfaces together or by a deflectable gasket, the seal of the instant invention is perfected directly between the mating conical surfaces 22 and 30 and is applied axially by the connecting means and outwardly radially by internal pressure deflecting the recessed wall 38. Accordingly, the diameter of the male conical surface 30 increases in response to a predetermined pressure in the fluid passageway, i.e., the circumference of the conical surface 30 increases in proportion to the internal line pressure.

More specifically, the recessed wall 38 has a reduced radial cross-sectional area immediately adjacent the conical surface 30. Unlike the remainder of the connector member 12, the thinner recessed wall 38 is outwardly deflectable in response to internal pressure within the passageway 28.

The mating conical surfaces 22 and 30 define a parting line therebetween. The assembly 10 includes an O-ring gasket 40 for providing sealing means adjacent the recessed wall 38 and about the inner end of the parting line defined by the mating conical surfaces 22 and 30 for further perfecting a seal about the inner end of the parting line when the internal pressure within the passageways 18 and 28 is applied. Initially, the O-ring 40 provides a seal about the inner end of the parting line defined by the mating conical surfaces 22 and 30 to prevent fluid escape therethrough. As the high pressure is reached, having a range of pressure as experienced in normal hydraulic systems, the recessed walls 38 of the connector member 12 are deflected radially outwardly to further perfect a seal between the mating surfaces 22 and 30. Thus, the instant invention provides a structurally strong and efficient high pressure seal.

The annular neck portion 24 provides retaining means for retaining the seal 40 against the parting line defined by the mating conical surfaces 22 and 30. The outer surface of the neck portion 24 is radially inwardly spaced from the recessed wall 38 defining an angular pocket 42 therebetween. The O-ring 40 is disposed within the pocket 42.

The connector member 12 includes an annular seat portion 44 immediately adjacent the male end portion thereof. The neck portion 24 of the line 20 is seated within the seat portion 44 allowing fluid to pass therethrough into the pocket 42. The seat portion 44 includes a female conical surface 46. A seal is not perfected between the neck portion 24 and the seat portion 44. Rather, the mating portions 24 and 44 provide means for aligning the members 12 and 20 together.

A second embodiment of the instant invention is shown by the connection of the connector member 12 to the pump casing 16. The connector member 12 is symmetrical at each end. An insert member 48 defines a neck portion 50 which is in mating engagement with the seat portion 44 of the connector member 12. The neck portion 50 provides retaining means for retaining a seal 52 within the pocket 42, the pocket 42 being defined by the space between the recessed wall 38 of the connector member 12 and the neck portion 50. An annular shoulder 54 extends outwardly from the neck portion 50 for engaging the seal 52. The seal is an annular member having a male conical surface 56 which engages the female conical surface 58 of the pump casing 16 to perfect a low pressure seal at the parting line between the female conical surface 58 of the pump casing 16 and male conical surface 30 of the connector 12. The neck portion 50 further includes a male conical end surface 51 in loose mating engagement with the female conical surface 46 of the connector member 46 thereby allowing the access of pressurized fluid into the pocket 42 to perfect the seal.

The pump casing has an internal threaded portion 60 which threadedly engages the outer threaded surface 32 of the connector member 12. The connector 12 is brought into threaded engagement with the pump casing 16 to axially urge the mating conical surfaces 30 and 58 together. High pressure within the passageways 14 and 28 deflects the recessed wall 38 of the connector 12 against the female conical surface 58 to perfect a strong and effective field therebetween.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

PRIOR ART STATEMENT PURSUANT TO RULE 656

Prior art uncovered during a novelty search were reviewed by the applicant and the undersigned attorney to establish a more precise definition of the invention in view of the prior art, recognizing that the scope of the searched invention may have been enlarged or shifted as defined in the claims in view of the uncovered prior art. The following prior art were uncovered, the most pertinent being discussed in the specification:

U.S. Pat. No. 640,197: Hewlett,
U.S. Pat. No. 2,118,670: Green,
U.S. Pat. No. 2,131,509: Goepel et al.,
U.S. Pat. No. 2,192,565: Szekely,
U.S. Pat. No. 2,760,673: Laurent,
U.S. Pat. No. 2,788,231: Crow,
U.S. Pat. No. 3,160,426: Faeser,
U.S. Pat. No. 3,258,279: Johnsen,
U.S. Pat. No. 3,600,010: Downs et al.

The embodiments of the invention in which an exclusive property or privilege is claimed are defined as follows:

1. A connector assembly (10) comprising: a first member (16,20) including a first fluid passageway (14,18) therethrough and a female end portion having a conical surface (22,58); a second member (12) including a second passageway (28) therethrough in fluid communication with said first passageway (14,18) and a male end portion having a conical surface (30) in mating engagement with said conical surface (22,58) of said female end portion; and connecting means for axially urging said conical surfaces (22,30,58) into mating engagement and characterized by said second passageway (28) within said male end portion having an increased diameter defining a recessed wall (38) thereabout being outwardly radially deflectable in response to internal fluid pressure applied against said recessed wall (38) to perfect a seal between said conical surfaces (22,30,58), said mating conical surfaces (22,30,58) defining a parting line having an inner end, said assembly (10) including sealing means (40,52) disposed within said recessed wall (38) and about said inner end of said parting line for further perfecting a seal at said parting line when the internal pressure is initially applied thereto.

2. An assembly as set forth in claim 1 further characterized by said recessed wall (38) having a reduced radial cross-sectional area immediately adjacent said conical surface (30) and being outwardly deflectable in response to internal fluid pressure within said passageway (28).

3. An assembly as set forth in claim 2 further characterized by retaining means (24, 50) for retaining said sealing means (40) against said parting line.

4. An assembly as set forth in claim 3 further characterized by said retaining means (24, 50) including an annular neck portion (24, 50) within and beyond said conical surface (22, 58) of said first member (16, 20) and being radially spaced from said recessed wall (38) defining an annular pocket (42) therebetween, said sealing means (40, 52) being disposed within said pocket (42).

5. An assembly as set forth in claim 4 further characterized by said second member (12) including an annular seat portion (44) immediately adjacent said male end portion, said neck portion (24, 50) being seated within said seat portion (44) allowing fluid to pass therebetween into said pocket (42).

6. An assembly as set forth in claim 5 further characterized by said seat portion (44) including a female conical surface (46).

7. An assembly as set forth in claim 6 further characterized by said neck portion (24) extending from said first member (20) and being an integral portion thereof.

8. An assembly as set forth in claim 6 wherein the neck portion (50) includes an insert member (48) seated within said seat portion (44).

9. An assembly as set forth in claim 8 further characterized by including an annular shoulder (54) extending outwardly from said neck portion (50) for engaging said sealing means (52).

10. An assembly as set forth in claim 6 further characterized by said neck portion (24, 50) having a male conical surface (26, 51) in mating engagement with said female conical surface (46) of said seat portion (44) while allowing fluid to pass therethrough.

* * * * *